June 14, 1932.    L. A. CAMEROTA    1,863,520
ROLLER CONVEYER
Filed Aug. 12, 1931
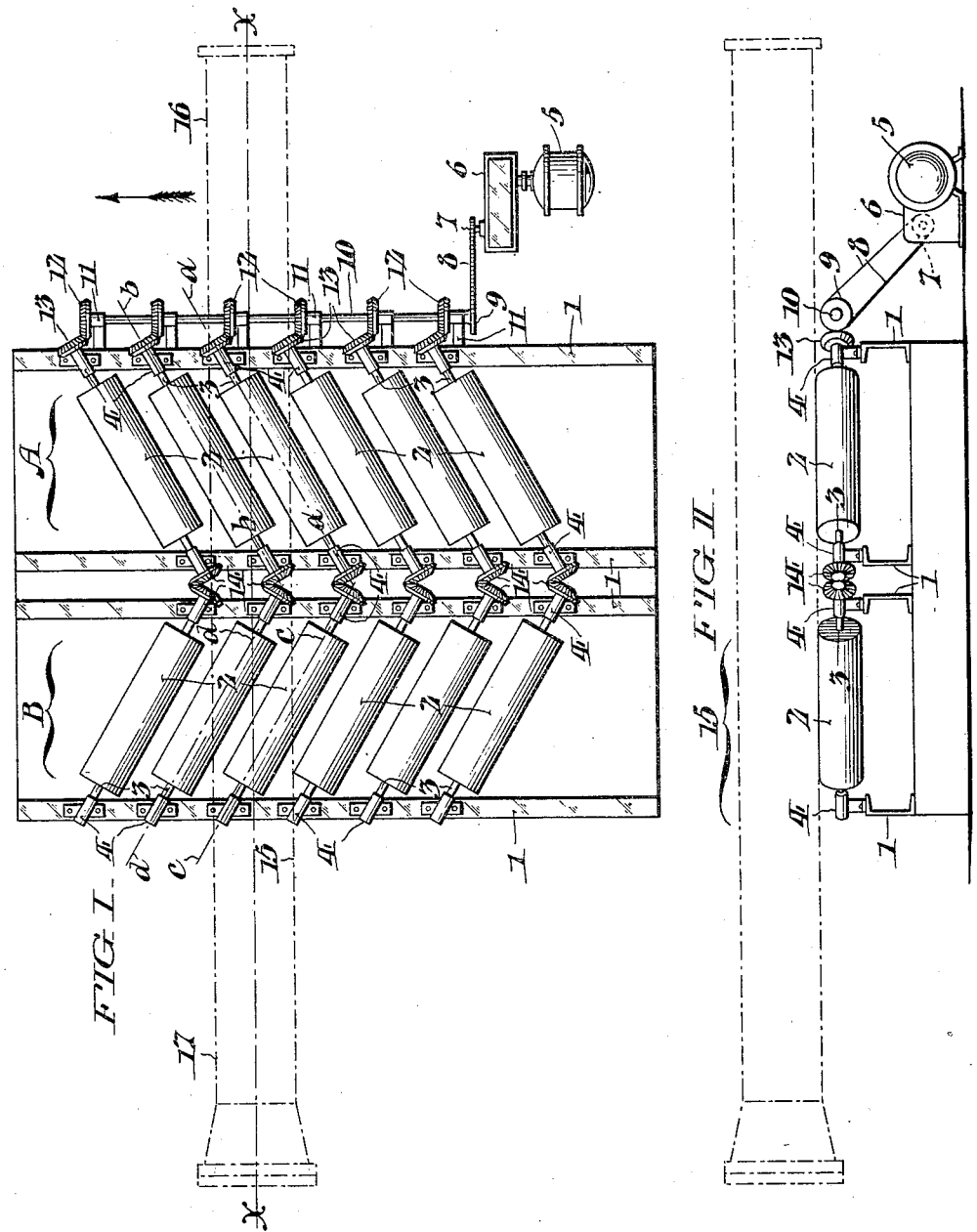

Patented June 14, 1932

1,863,520

UNITED STATES PATENT OFFICE

LOUIS A. CAMEROTA, OF BURLINGTON, NEW JERSEY, ASSIGNOR TO WALTER WOOD, OF PHILADELPHIA, PENNSYLVANIA

ROLLER CONVEYER

Application filed August 12, 1931. Serial No. 556,545.

This invention relates to roller conveyers and more particularly to a conveyer especially adapted for the progression of cylindrical objects, such as pipe flasks, pipes, or the like from one station to another.

The principal object of my invention is to provide a conveyer, made up of comparatively simple and inexpensive instrumentalities, with rollers so designed and interrelated as to maintain the axes of cylindrical objects moved thereon at all times transverse to the longitudinal axis of the conveyer. Heretofore, for the progression of cylindrical pipe flasks in a foundry, it has been customary to employ parallel skids or rails, and to roll the flasks along such skids or rails. With such an arrangement difficulty has been experienced in maintaining the axes of the flasks transverse to the skids or rails throughout an appreciable length of travel, this difficulty arising partly from the fact that the outside diameter of a flask may not be uniform throughout its length, and partly from the fact that dirt, dust or scale may alter the diameters of the flasks at the points of bearing upon the skids or rails.

My present invention is characterized by the provision of a plurality of adjacent rows of rollers, with the rollers of each row disposed with their axes parallel with each other and oblique to the axes of the rollers of an adjacent row, and with all of the rollers connected together, as by suitable gearing, to rotate at the same speed.

Other objects and advantages characterizing my invention will become more fully apparent from the description which follows hereinafter, and which has reference to the accompanying drawing. Of the drawing:

Fig. I represents a plan view of a power driven type of roller conveyer embodying my invention, and showing the outline of a pipe flask mounted for movement on the conveyer; and, Fig. II represents an end elevation of the same.

The conveyer shown in the drawing is particularly adapted for use in a pipe foundry for the progression of pipe flasks or pipes from one station to another, and the particular conveyer selected for illustration is of a motor propelled type, though it will be apparent that the principle of my invention may be applied to a conveyer in which the objects are progressed by hand.

In the example illustrated, the conveyer comprises a rectangular frame made up of parallel channel beams 1 and rollers 2 rotatably mounted on the upper flanges of the channel beams. The channel beams are so arranged as to provide supports for two adjacent rows of rollers designated at A and B. The rollers 2 may be of any conventional type and include pins or axles 3 projecting from the ends thereof and fitting in bearings 4 secured to the upper flanges of the beams 1 of the frame structure. The rollers of each row are disposed with their axes parallel with each other and oblique to the axes of opposite rollers of the adjacent row.

A motor 5 is shown as the driving medium of the conveyer. Connected to the motor 5 there may be a reduction gear, as diagrammatically indicated at 6, having a pulley 7 connected by means of a belt 8 to a pulley 9 on a drive shaft 10. The drive shaft 10 is secured by suitable brackets 11 to the channel beam 1 at the side of the conveyer. Upon the drive shaft 10 bevel gears 12 are mounted, there being one bevel gear for each roller 2 of the row A of rollers at that side of the conveyer. The bevel gears 12 mesh with corresponding bevel gears 13 affixed to the axles of the rollers 2 of row A. Between the two rows of rollers additional bevel gears 14, all having the same number of teeth, are provided connecting each roller of row A with a correspondingly oblique roller of the adjacent row B. Accordingly, operation of the motor 5 serves in an obvious manner to turn all of the rollers 2 of rows A and B at the same speed of rotation.

The angle between the axes of the rollers 2 and the longitudinal axes of the conveyer and the distance between neighboring rollers is so designed that when a pipe flask, such as indicated at 15, is mounted on the conveyer, the pipe flask will bear at all times throughout its progression upon two rollers of each row; and thus will at all times be influenced by the rotating movement of the rollers, there being no position along the length of the conveyer in which the pipe flask is out of contact with a rotating surface.

When the motor 5 is operated, with resulting rotation of all of the rollers 2, a succession of flasks 15 may be automatically progressed thereon with their axes parallel to each other and transverse to the longitudinal axis of the conveyer. Any tendency for one end of a flask to get ahead of the other end is immediately corrected by reason of the rollers of row A being oblique to the rollers of row B. Assuming, for example, that a flask 15 is travelling in the direction of the arrow and that its end 16 is in advance of its end 17, the corrective movement will take place as follows. The line of contact represented at $x-x$ will no longer intersect the axes $a-a$ and $b-b$ of a pair of adjacent rollers of row A. The line of contact $x-x$ will, however, continue to intersect the axes $c-c$ and $d-d$ of a pair of adjacent rollers of row B. Accordingly, as the end 16 of the flask 15 moves out of contact with the roller, the axis of which is designated at $a-a$, and before it comes into contact with the roller, the axis of which is designated at $b-b$, there will be an interim in which the end 16 is not subject to the rotating movement of either of these rollers and during which the opposite end 17 of the flask contacting with the corresponding rollers of row B, will continue to travel in the direction of the arrow. In this manner the flask will be maintained throughout its travel with its axis substantially transverse to the longitudinal axis of the conveyer.

While I have described one particular embodiment of my invention, it will be apparent that various changes may be made in the form of the apparatus described without departing from the spirit of the invention as defined in the claims annexed hereto.

Having thus described my invention, I claim:

1. A roller conveyer comprising a frame, cylindrical rollers rotatably mounted thereon in a plurality of adjacent rows in a common plane, the rollers of each row having their axes parallel with each other and oblique to the axes of opposite rollers of an adjacent row, and means connecting each roller of one row with a corresponding roller of said adjacent row to cause said corresponding rollers to rotate at the same speed.

2. A roller conveyer comprising a frame, cylindrical rollers rotatably mounted thereon in a plurality of adjacent rows in a common plane, the rollers of each row having their axes parallel with each other and oblique to the axis of opposite rollers of an adjacent row, and bevel gears connecting each roller of one row with a corresponding roller of said adjacent row.

3. A roller conveyer for conveying cylindrical objects, comprising a frame, cylindrical rollers rotatably mounted thereon in a plurality of adjacent rows in a common plane, the rollers of each row having their axes parallel with each other and oblique to the axes of the rollers of an adjacent row, and the rollers of each row being so spaced that a cylindrical object disposed thereon with its axes perpendicular to the line of travel will at all times bear upon two rollers of each row, and means connecting each roller of one row with a corresponding roller of said adjacent row to cause said corresponding rollers to rotate at the same speed.

4. A roller conveyer comprising a frame, cylindrical rollers rotatably mounted thereon in a plurality of adjacent rows in a common plane, the rollers of each row having their axes parallel with each other and oblique to the axes of opposite rollers of an adjacent row, and gears connecting all of said rollers of said rows together whereby they are caused to rotate at the same speed.

5. A roller conveyer comprising a frame, cylindrical rollers rotatably mounted thereon in a plurality of adjacent rows in a common plane, the rollers of each row having their axes parallel with each other and oblique to the axes of opposite rollers of an adjacent row, a drive shaft geared separately to the rollers of one row, and bevel gears connecting each roller of one row with a corresponding roller of said adjacent row.

In testimony whereof, I have hereunto signed my name at Florence, New Jersey, this seventh day of August, 1931.

LOUIS A. CAMEROTA.